US012680183B2

(12) United States Patent    (10) Patent No.:   US 12,680,183 B2

Ng et al.      (45) Date of Patent:     Jul. 14, 2026

(54) ARTIFICIAL INTELLIGENCE PRESSURE CONTROL MULTIPLE TRACK INJECTION LIQUID-TO-GAS CONVERSION METHOD

(71) Applicants: Charles H Ng, Palo Alto, CA (US); Hokchung Ng, Toronto (CA)

(72) Inventors: Charles H Ng, Palo Alto, CA (US); Hokchung Ng, Toronto (CA)

( * ) Notice: Subject to any disclaimer, the term of this patent is extended or adjusted under 35 U.S.C. 154(b) by 488 days.

(21) Appl. No.: 18/233,123

(22) Filed: Aug. 11, 2023

(65) Prior Publication Data

US 2024/0183049 A1     Jun. 6, 2024

Related U.S. Application Data

(60) Provisional application No. 63/429,919, filed on Dec. 2, 2022.

(51) Int. Cl.
| | |
|---|---|
| *C25B 15/027* | (2021.01) |
| *C25B 1/04* | (2021.01) |
| *C25B 15/029* | (2021.01) |
| *C25B 15/08* | (2006.01) |
| *G06F 17/18* | (2006.01) |

(52) U.S. Cl.
CPC .............. *C25B 15/027* (2021.01); *C25B 1/04* (2013.01); *C25B 15/029* (2021.01); *C25B 15/08* (2013.01); *G06F 17/18* (2013.01)

(58) Field of Classification Search
CPC ....... C25B 15/027; C25B 1/04; C25B 15/029; C25B 15/08; C25B 9/23; C25B 15/02; C25B 15/023; G06F 17/18; C02F 1/46; C02F 1/70; C02F 1/72
See application file for complete search history.

(56) References Cited

U.S. PATENT DOCUMENTS

| | | | |
|---|---|---|---|
| 2021/0254227 A1* | 8/2021 | Lee | C25B 15/021 |
| 2023/0315054 A1* | 10/2023 | Aghatehrani | G05B 19/4155 |
| | | | 700/28 |
| 2023/0374681 A1* | 11/2023 | Yellepeddi | C25B 1/04 |
| 2024/0093395 A1* | 3/2024 | Kudo | C25B 3/25 |

* cited by examiner

*Primary Examiner* — Bryan D. Ripa

(57) ABSTRACT

Electron exchangers are placed in the conversion cell and divide it into cathode gas chamber, liquid conversion solution chamber filled with a multiple track injection liquid controller, and anode gas chamber. Voltage is applied to the electron exchangers to convert the liquid conversion solution to gases, and gases are released directly to the gas chambers. On the surfaces of the single sheets of the multiple track injection liquid controller, there are many tracks and puncture channels that are designed by critical surface calculations, and manufactured with a precision technology. A computing engine connected to the cloud is responsible for artificial intelligence calculations, and it controls valves, sensors, servo motors, and enhance gas flow devices. In producing the same amount of final gases, our method is energy efficient.

20 Claims, 5 Drawing Sheets

ARTIFICIAL INTELLIGENCE PRESSURE CONTROL MULTIPLE TRACK INJECTION LIQUID-TO-GAS CONVERSION METHOD

CROSS-REFERENCE TO RELATED APPLICATIONS

This application claims the benefit of Provisional Patent Application Ser. #U.S. 63/429,919 filed Dec. 2, 2022 by the present inventors, which is incorporated by reference in its entirety.

TECHNICAL FIELD

The present invention relates to liquid to gas conversion method with an electrical voltage, specifically to such a method which is energy efficient.

BACKGROUND ART

It is known in the prior art that liquid-to-gas conversion is commonly achieved by the application of a voltage to a liquid conversion solution through two pieces of conductive materials to produce final gases. With two pieces of conductive materials immersed in the liquid conversion solution, as anode and cathode, the conductive materials are under direct contact with the liquid conversion solution. Electrons are exchanged between these conductive materials and the liquid conversion solution, and final gases are released as bubbles from the immersed conductive materials. The gases float upward from the liquid conversion solution to the gas chambers above. This prior process is generally not energy efficient.

SUMMARY

Our method provides an energy efficient liquid-to-gas conversion using artificial intelligence pressure control multiple track injection conversion cell.

DRAWINGS—FIGURES

Figure 1:
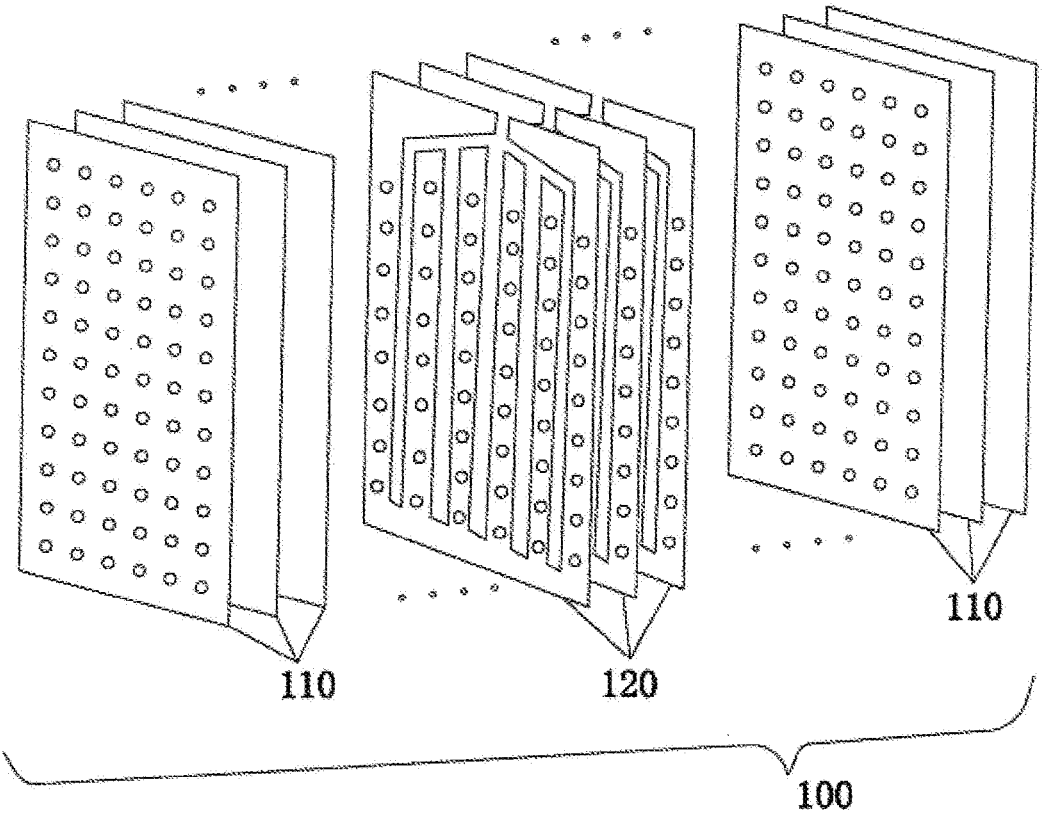
Figure 2:
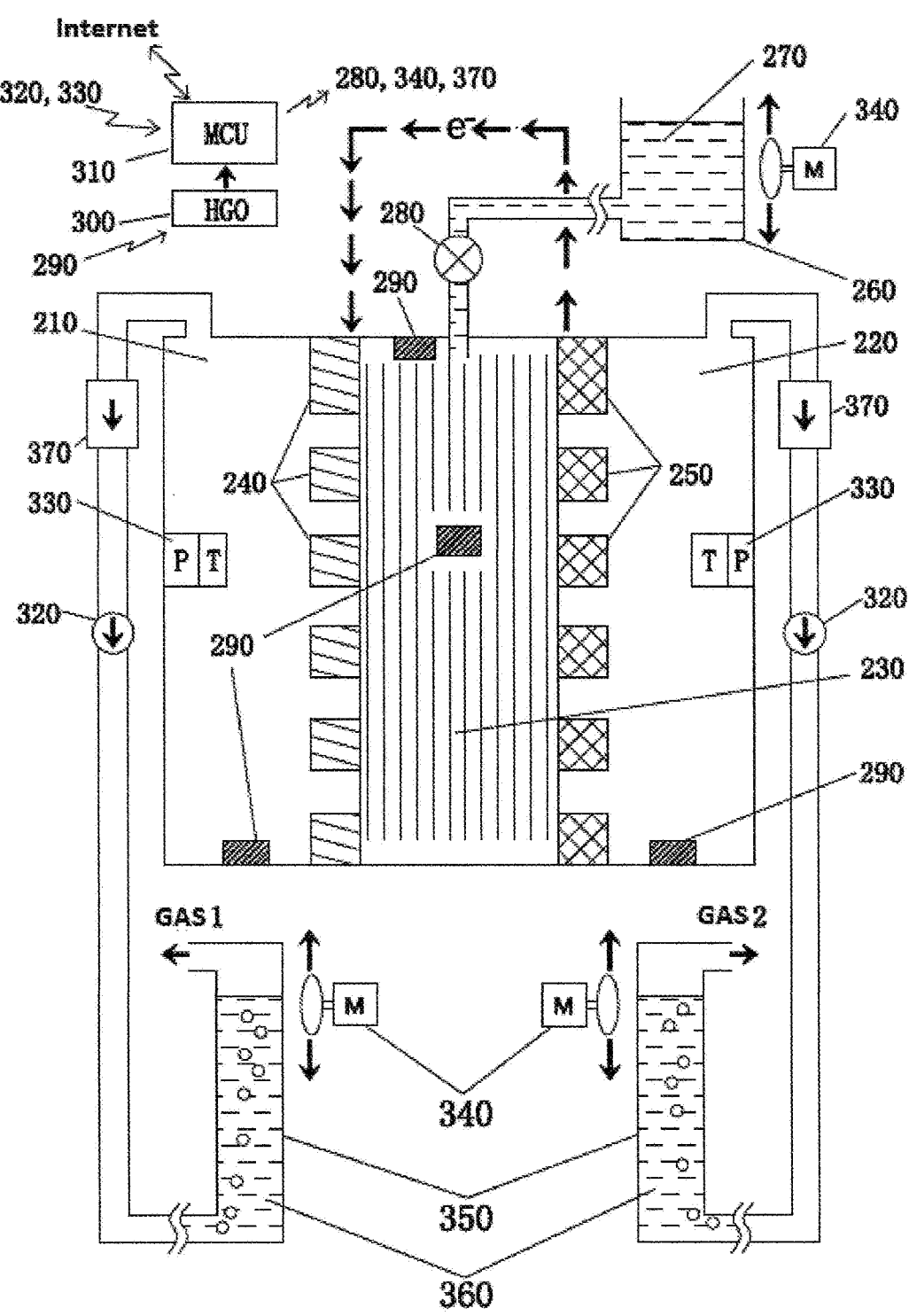
Figure 3:
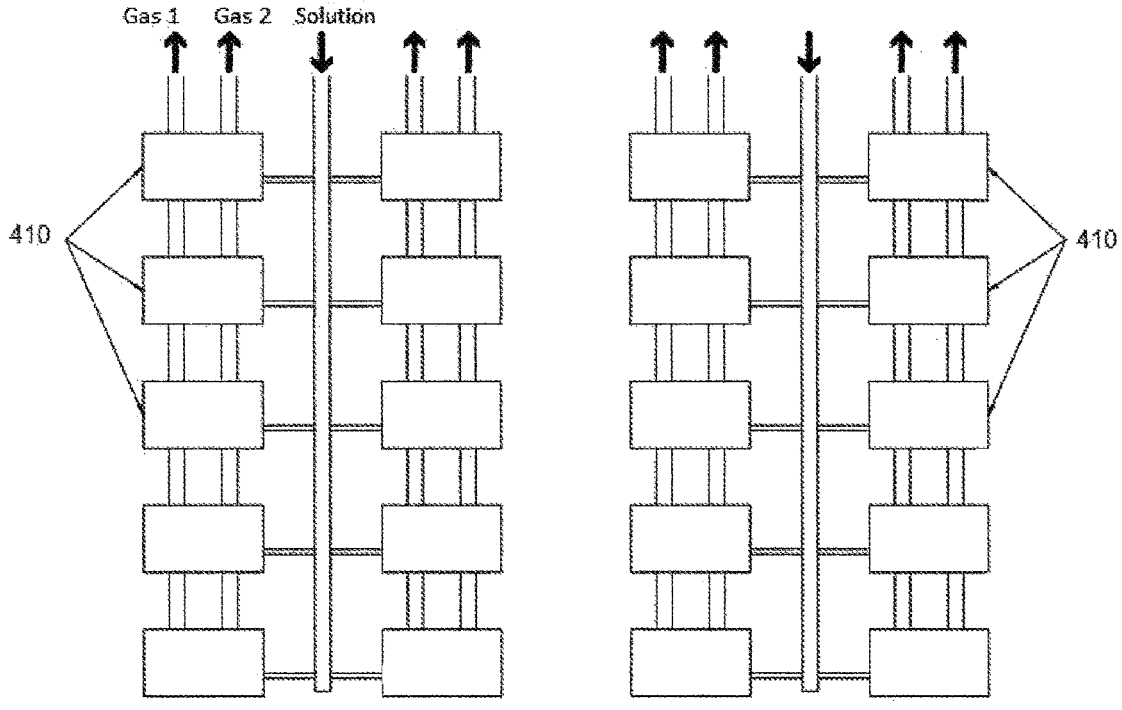
Figure 4:
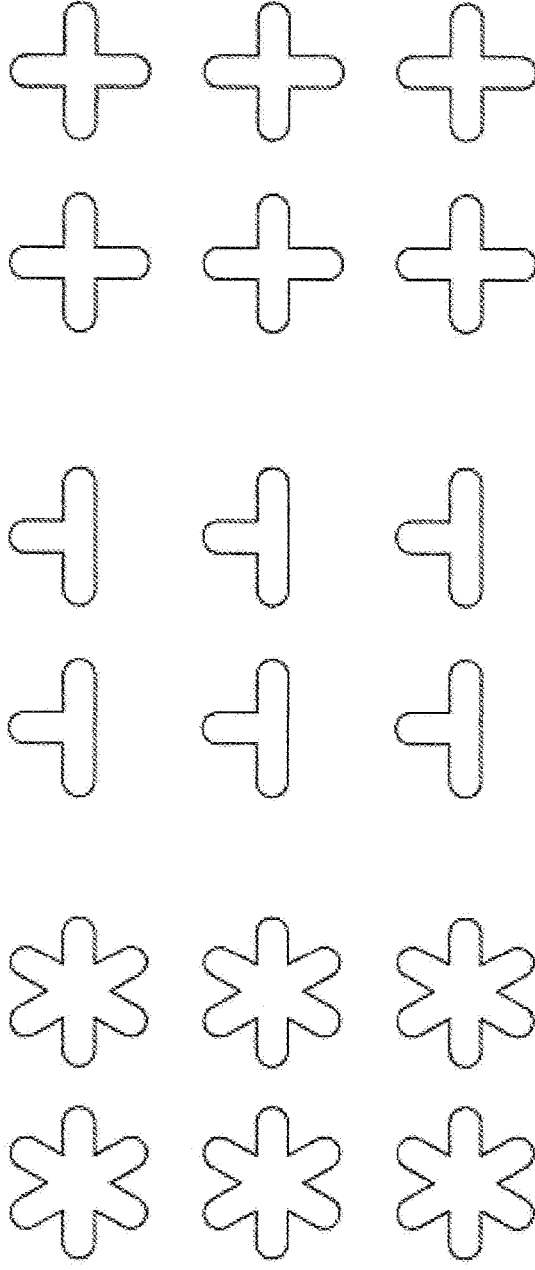

1) FIG. 1: Liquid controller, composed of three types of controller sheets stacked together
2) FIG. 2: Liquid-to-gas conversion cell
3) FIG. 3: Stacking of conversion cells
4) FIG. 4: Design patterns for puncture channels
5) FIG. 5: Multiple track injection sheet

DRAWINGS—REFERENCE NUMERALS

100: Liquid controller
110: Combination of liquid control sheets and mesh material sheets
120: Multiple track injection sheets
210: Cathode gas chamber
220: Anode gas chamber
230: Liquid conversion solution chamber filled with the liquid controller
240: Cathode electron exchanger
250: Anode electron exchanger
260: Liquid reservoir
270: Liquid conversion solution
280: Liquid flow valve
290: Liquid content sensor
300: Hygrometer
310: Microprocessor (MCU)

320: Gas flow sensor
330: Temperature sensor and gas pressure sensor
340: Servo motor
350: Gas cleaning cell
360: Gas cleaning liquid
370: Enhance gas flow device
410: Liquid-to-gas conversion cell
500: Multiple track injection sheet
510: Liquid inlets at the multiple track injection sheet
520: Tracks of the multiple track injection sheet
530: Puncture channels of the multiple track injection sheet

Description

Our method discloses an artificial intelligence pressure control multiple track injection liquid-to-gas conversion method.

The anode and the cathode electron exchangers are placed in the liquid-to-gas conversion cell, and the conversion cell is divided into, from one side to the other side, the cathode gas chamber, the liquid conversion solution chamber filled with the liquid controller, and the anode gas chamber. One side of the electron exchangers faces the liquid conversion solution chamber and in direct contact with the liquid controller, and this side is coated with non-conductive polymer material. The other side of the electron exchangers faces the gas chambers, and this side is conductive. The surfaces of the electron exchangers are covered with a number of holes. Voltage is applied to the anode electron exchanger and the cathode electron exchanger, electrons are exchanged on the side that is facing the gas chambers, and the liquid conversion solution is converted into final gases, which are released separately into the cathode gas chamber and the anode gas chamber. Gases pass through the two gas chambers outlets to the cathode and anode gas cleaning cells gas inlets. Gas cleaning cells are filled with gas cleaning liquid. Gas bubbles rise from the gas inlets of the gas cleaning cells to the gas outlets at the top of the gas cleaning cells.

Solvent is added to the liquid conversion solution to ionize the molecules of the liquid conversion solution. The temperature and gas pressure of the conversion cell can be adjusted according to the gas production level, and the conversion rate of the conversion cell is increased accordingly.

The liquid controller is placed in the liquid conversion solution chamber, and the liquid controller is built with nonconductive controller sheets stacked together, comprising: multiple track injection sheet, liquid control sheet, and mesh material sheet. See FIG. 1. The number of controller sheets ranges from 3 to 10,000 sheets or more.

Figure 5:
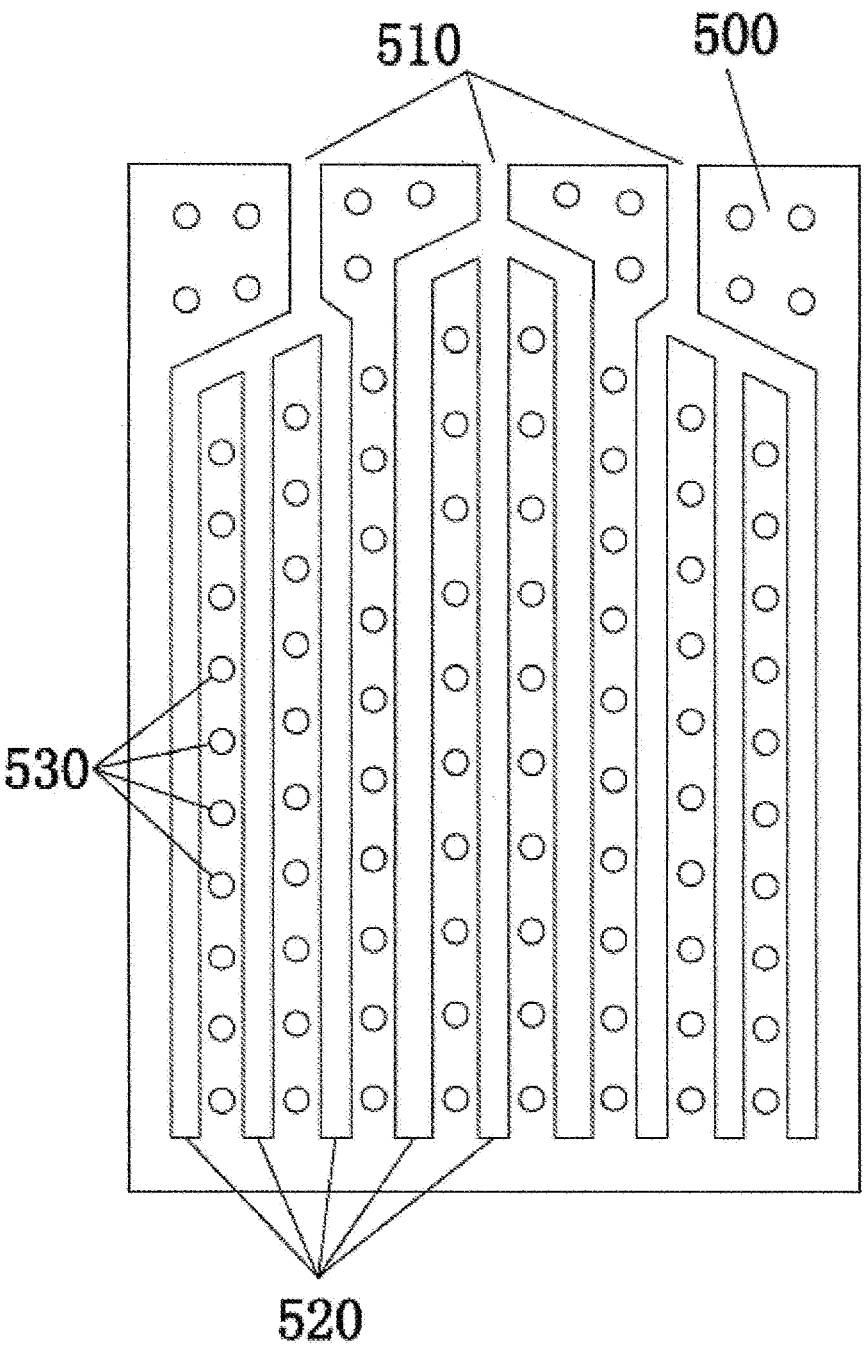

The first type of controller sheet is a multiple track injection sheet that has a number of tracks and puncture channels on the surface, see FIG. 5. The tracks form a network of distribution channels from the multiple liquid inlets to the different locations across the multiple track injection sheet. The multiple track distribution network helps the liquid to be injected evenly and quickly. In addition to the tracks, the sheet surface is also covered with many puncture channels with design patterns, see FIG. 4. The patterns enhance the ability of liquid conversion solution to adhere to the surfaces of the multiple track injection sheets. A number of the multiple track injection sheets are placed at the center of the liquid controller, and they are sandwiched from the left and from the right by a mixture of the second type of liquid control sheets and the third type of mesh material sheets. The liquid control sheets and the mesh material sheets protect against any gas bubbles getting through the multiple track injection sheets in the middle.

The material for the first type and the second type of controller sheet can be stainless steel, copper, or aluminum, and the sheet coated with nonconductive polymer material, or other materials with similar effects.

The second type of controller sheet is a liquid control sheet, and it has many puncture channels on the surface. The puncture channels have a specially designed pattern, see FIG. 4.

The third type of controller sheet is mesh material sheet built with polymer or nylon meshed materials with a lot of pores. The mesh structure enhances the ability of liquid conversion solution molecules to adhere to the surface the mesh material sheet.

When the first type and the second type contoller sheets are stacked together, the puncture channels on adjacent controller sheets are kept out of alignment with each other. In other words, the puncture channels from adjacent controller sheets are located at different positions from each other, and they are separated to form a pattern of interlocking channels. These interlocks enhance the ability of liquid conversion solution molecules to adhere to the liquid controller.

The first type multiple track injection sheets and the second type liquid control sheets are manufactured by a precision technology, comprising: chemical etching, plasma etching, laser drilling or electroforming process. The manufacturing of the controller sheets can begin with conductive or nonconductive materials. The first option is chemical etching, which is a relatively low-cost process to make the desired controller sheets. This chemical etching process can be applied to a piece of conductive material of the desired specification, and chemicals etch away specific spots of the material to form the tracks or puncture channels. For the second option, it is also possible to plasma etching on a nonconductive polymer material, and plasma etches away specific spots of the nonconductive polymer material to form the tracks or puncture channels. The third option is laser drilling, in which a piece of conductive or non-conductive material that meets the requirements is repeatedly applied with pulsing focused laser energy to cut through the material to form the tracks or puncture channels. A fourth option is electroforming, where nanometer scale or micrometer scale metal devices are fabricated by electrodepositing on a pattern called a mandrel. The desired conductive material is electrodeposited on the mandrel to form the controller sheets, the tracks, and the puncture channels. If the making of the controller sheets starts from a conductive material, after the puncture channels are made by one of the above processes, the surface of the conductive material is coated with a nonconductive polymer material to make the controller sheets nonconductive.

The third type mesh materials sheet is nonconductive and is manufactured by precision material woven technology.

The combination of various physical parameters, the design of the three types of controller sheets, the stacking of the controller sheets, the design of the multiple tracks, and the design of the puncture channels is the key to control the ability of the liquid conversion solution to adhere to the liquid controller, and to make the liquid conversion solution forming thin films on the controller sheet critical surface. The thickness of the controller sheet, the spacing between adjacent controller sheets, the size of the multiple tracks, the size of the puncture channels, and the distance separating the channels should not be too large or too small, in the range of nanometers to micrometers, and should be calculated by the following method.

The liquid conversion solution stays on the critical surfaces of the controller sheets as droplets. It will diffuse until a partial wetting equilibrium contact radius is reached. For a simple estimation calculation, the droplet radius r can be expressed as:

$$r = \sqrt{\frac{V}{\pi h}}, \text{ where } h = \sqrt{\frac{2\sigma(1 - \cos\theta)}{\rho g}}$$

α is the surface tension
g is the gravitational acceleration constant
θ is the contact angle between the liquid and the surface
h is the height of the droplet
V is the volume of the droplet
Using a more detailed model and calculations, the change in droplet radius r(t) over time can be expressed as:

$$r(t) = r_e\left[1 - \exp\left(-\left(\frac{2\gamma_{LG}}{r_e^{12}} + \frac{\rho g}{9r_e^{10}}\right)\frac{24\lambda V^4(t + t_0)}{\pi^2 \eta}\right)\right]^{\frac{1}{5}}$$

It is also possible to assume perfect spreading of the liquid conversion molecules and radius rp(t) can be expressed as:

$$rp(t) = \left[\left(\gamma_{LG}\frac{96\lambda V^4}{\pi^2 \eta}(t + t_0)^{\frac{1}{2}} + \left(\frac{\lambda(t + t_0)}{\eta}\right)^{\frac{2}{3}}\frac{24\rho g V^{\frac{8}{3}}}{7 \cdot 96^{\frac{1}{3}}\pi^{\frac{4}{3}}\gamma_{LG}^{\frac{1}{3}}}\right]^{\frac{1}{6}}$$

γ is coefficient of said surface tension,
γLG is the term factor of surface tension of the liquid
V is the droplet volume
η is the viscosity of the liquid
ρ is the density of the liquid
g is the gravitational acceleration constant
λ is the shape factor
t0 is the experimental delay time
re is the radius of the droplet at equilibrium
Assuming that the delay time is 0.1 to 2 seconds to calculate the droplet radius r(t), The width of each track on the first type multiple track injection-sheet should be larger than r(t) or rp(t), this width should be set as 500% to 5,000% of r(t) or rp(t).

For the first type and the second type controller sheet, the spacing between adjacent puncture channels should be set as 100% to 200% of the droplet radius.

For the first and second type controller sheet, the radius of the puncture channel should be set as no larger than r(t) or rp(t).

The radius of the pores in the third type of mesh material sheet should be set as no larger than r(t) or rp(t).

In common liquid conversion solution materials, the width of the track can be from 500 micrometer to 5,000 micrometer, and the diameter of the pores and puncture channel can be from 100 nanometers to 100 micrometers. The size of the pores, the width of the multiple tracks, and size of the puncture channels can be adjusted based on the operating temperature, air pressure, as well as the desired gas production level.

On the same controller sheet, the width of the track and the size of the puncture channel can be different. The size can be smaller or larger depending on whether their locations are closer to or farther away from the source of the liquid conversion solution.

For the three types of controller sheet, the thickness and the distance between adjacent sheets can be calculated in the following:

The height h of a liquid column is given as $$h = \frac{2\gamma\cos\theta}{\rho g r}$$

γ is the liquid-air surface tension coefficient (force/unit length),

Θ is the contact angle,

ρ is the density of liquid, g is the gravitational acceleration constant, and r is the radius of liquid column.

For the three types of controller sheet, the thickness of the controller sheets should be as no thicker than h. The thickness of the sheets is approximately equal to 100 nanometers to 100 microns in common liquid conversion solution materials. The thickness can be adjusted according to the operating temperature, air pressure, as well as the desired gas production level.

The liquid controller is formed by stacking a number of the three types of controller sheet, and the spacing between adjacent controller sheets should not be greater than 50% to 100% of h. In common liquid conversion solution materials, the spacing between individual sheets is approximately between 50 nanometers and 100 microns. The spacing can be adjusted according to the operating temperature, air pressure, as well as the desired gas production level.

The liquid conversion cell is equipped with an intelligent microprocessor (MCU) to carry out artificial intelligence machine learning calculation, and data is also transmitted to the local computing engine or to the cloud computing engine via the Internet for calculation. Microprocessor controls the liquid flow valves, enhance gas flow device, and the height servo motors, in order to adjust the liquid pressure, gas pressure, and temperature at the cathode gas chamber, the liquid conversion solution chamber, and the anode gas chamber, and affect the efficiency of the liquid conversion cell.

A liquid flow valve is placed at liquid inlet of the liquid controller and it feeds liquid conversion solution directly from the liquid reservoir to a number of the liquid inlets of the multiple track injection sheets at the liquid controller. The microprocessor controls the flow valve and decides whether to increase or decrease the flow of the liquid conversion solution to the liquid inlets of the multiple track injection sheets.

Microprocessor is connected to a servo motor to control the height distance from the top of liquid in the liquid reservoir to the liquid controller, and the height distance directly controls the liquid pressure that is applied to the liquid controller.

Microprocessor is connected to another two servo motors to control the height distance from the top of the liquid inside the gas cleaning cells to the gas inlets inside the gas cleaning cells. This liquid height distance inside the gas cleaning cell controls the outlet gas pressure at the gas chambers inside the liquid conversion cell.

Microprocessor connects to two enhance gas flow devices, such as electric gas flow fans, at the outlets from the two gas chambers, and controls the gas flow in order to increase or decrease the gas pressure coming from the gas chambers.

The microprocessor fast response speed is around one to two seconds and can control these devices and various parameters in real time.

The microprocessor is also connected to four liquid content sensors, temperature sensors, pressure sensors, height distance sensors, gas flow sensors, voltage sensor, and current sensor. More sensors can be placed at selected locations within the conversion cell, liquid reservoir, and gas cleaning cells, if necessary. Each liquid content sensor has a pair of resistance probes to sense the liquid content of the liquid conversion solution at different locations in the conversion cell. The probes are made of anti-corrosion and anti-oxidation conductive materials, or they can be coated with highly conductive anti-corrosion and anti-oxidation materials to prevent the probe from oxidation over time.

The first liquid content sensor is placed at the liquid inlet side of the liquid controller, and the second liquid content sensor is placed near the middle of the liquid controller in order to detect the liquid content of the liquid conversion solution in those locations. The microprocessor senses that the liquid content at these locations, it will increase the flow valve when there is too little liquid, or decrease the flow valve when there is too much liquid, and control the liquid conversion solution flow from the liquid reservoir to the liquid controller.

The third and fourth liquid content sensors are placed at the bottom of the cathode gas chamber, and the bottom of the anode gas chamber. If the microprocessor senses that there is a certain amount of liquid conversion solution at these locations, it means there is too much liquid conversion solution entering the liquid controller, and the electron exchangers cannot keep up with the liquid-to-gas conversion. The microprocessor will decrease the liquid flow valve to slow the liquid conversion solution flow to the liquid controller.

The microprocessor is connected to multiple temperature sensors and the pressure sensors that are placed inside or around the cathode gas chamber, the liquid conversion solution chamber, and the anode gas chamber. The microprocessor is connected to two gas output flow sensors that are each placed at the gas outlet from the cathode and anode gas chambers. The microprocessor is connected to the voltage and current sensors to measure the electrical voltage and current applied to the cathode and anode electron exchangers. The microprocessor is connected to multiple position sensors to measure the height distance from the top of the liquid reservoir to the liquid controller, and to measure the height distance from the top of the liquid inside the gas cleaning cell to the gas inlet inside the gas cleaning cell.

More sensors in the conversion cell can be handled using a similar approach as described above.

Based on the amount of liquid in the liquid controller, temperature, gas pressure, liquid pressure, height distance, voltage and current, gas output flow rate, and required gas production output rate, the microprocessor can adjust the working pressure and temperature of the cathode gas chamber, the liquid conversion chamber, and the anode gas chamber. Due to the intelligent microprocessor control, the conversion and power consumption efficiency of the liquid conversion cell increases accordingly.

The microprocessor sends the sensor data to the local wired or wireless network, and transmits the data to the cloud computing engine through the Internet to perform the artificial intelligence calculation and store the data in the cloud storage. Due to security concerns, these data can also be transmitted to the local computing engine through wired or wireless network, and the artificial intelligence calculations can be completed in the local computing engine.

The artificial intelligence computing engine calculates the control instructions from the analysis results, and transmits the control instructions to the microprocessor of the conversion cell. At the same time, operators in various locations can read the data and the artificial intelligence calculation results from the cloud server through mobile phones and computer tablets.

Machine learning is specifically a predictive modeling technique, and the main objective is to minimize the error of the model, and to make the most accurate prediction possible. Machine learning algorithms are described as learning target predictive model that can be used to predict output data based on future input data. Through the training of a large amount of previous data, the machine learning model continues to learn and improve its accuracy in predicting the function output from future new input data.

Machine learning algorithm is described as learning an objective prediction function (F) that best maps series of input data (X) to an function output (Y), in other words, predicts an output (Y) based on an input (X).

$$Y = F(X)$$

The algorithm applied, regression analysis, is one of the branches of artificial intelligence machine learning. We use an combination regression analysis with algorithms, comprising: 1) single variable regression, 2) multi variable regression, 3) linear regression, and 4) nonlinear regression.

In general, we can express the predictive function F(X) for the combination regression analysis as:

$$Y = F(X1, X2, \ldots, Xn),$$

series of function output=Y,
series of input data from Sensor 1=X1,
series of input data from Sensor 2=X2, . . . ,
series of input data from Sensor N or required gases output level=Xn.

Sensors 1 . . . N can be the liquid content sensors, temperature sensors, liquid pressure sensors, gas pressure sensors, gas flow sensors, height distance sensors, voltage sensor, or current sensor. X1 to Xn are the series of input data from the sensors or required gases output level.

In processing liquid content, temperature, pressure, gas flow, height distance, voltage, or current, if the data are within an accepted range, then Xn is set to 1, otherwise it is set to 0.

When training the model, series of input data X1, X2, . . . Xn and the "commonly well accepted" series of function outputs Y are collected as training data and fed into the model.

In our combination regression analysis, we first analyze the series of input data X1, X2, . . . Xn, divide each predictive function for one or more segments of input data ranges, and form sub predictive functions to obtain series of function outputs Y1, Y2, . . . Yk for each input data range. Over the whole input data range, predictive function F(X) is a combined result of all the sub predictive functions covering each of the input data range.

First, each series of input data of X1 to Xn is sorted into an ascending order. Express the first data point of series of input data X1 as X1.1, and the m th data point of series of input data X1 as X1.m. The increment in each input data Xn is compared to the increment in series of function output Y.

Express the increment from the $1^{st}$ X1 data point to the $2^{nd}$ X1 data point as $$dX1.2 = X1.2 - X1.1,$$
$$dX1.3 = X1.3 - X1.2, \ldots$$
$$dX1.m = X1.m - X1.m - 1$$

Express the increment in series of function output Y, as X1 data point moves from X1.1 to X1.m, and series of function output moves from Y1.1 to Y1.m, as $$dY1.2 = Y1.2 - Y1.1, \ldots$$
$$dY1.3 = Y1.3 - Y1.2, \ldots$$
$$dY1.m = Y1.m - Y1.m - 1$$

Express the increment in the Slope as X1 data point moves from X1.1 to X1.m as $$Slope1.2 = dY1.2/dX1.2,$$
$$Slope1.3 = dY1.3/dX1.3, \ldots$$
$$Slope1.m = dY1.m/dX1.m$$

Repeat these steps for all series of input data from X1 to Xn, whenever detect an significant change in the Slope value, form a new set of input data for this segment of data input range, and group each set of input data for each segment of input data range to form a separate sub predictive function. Submit each set of input data for each sub predictive function for training and for predicting future series of function outputs to multiple regression algorithms, comprising: least-square linear regression algorithm, least-square non-linear regression algorithm, regression neural network algorithm, and other equivalent regression algorithm.

First submit series of input data to the least-square linear regression algorithm, as an example, in the case of single variable, the series of function output y can be expressed as:

$$y_i = \alpha + \beta x_i + \varepsilon_i,$$
$$\hat{\beta} = \frac{\sum_{i=1}^{n}(x_i - \bar{x})(y_i - \bar{y})}{\sum_{i=1}^{n}(x_i - \bar{x})^2}$$
$$\hat{\alpha} = \bar{y} - \hat{\beta}\bar{x}$$

The general case for multiple variables linear regression can be obtained by similar method.

Second, submit each set of data to a least-square non-linear regression algorithm, as an example, in the case of single variable, the predictive function can be expressed with the same set of equations as in the above linear regression with the exception of replacing $x_i$ with one or more higher order factors of the square, the cube, or higher order of self multiple of $x_i$. The general case for multiple variables non-linear regression can be obtained by similar method.

Third, submit each set of data to a regression neural network algorithm, where the steps are as follows:

First, define L-layers of neural layers with a number of neurons in the neural network model, where each neural layer is repeated multiple L times until we get satisfactory results with our input data. Input data X1 to Xn to the first neural layer, and data is moved forward from one neural layer to the next neural layer. Define each layer to contain N neurons where N is set in the first neural layer to be the same as the number of input sensors or more. Define the number of neurons in each subsequent layer, and the number can drop by 0% to 50% from previous layer based on the success in processing the data. Define ReLU activation layer in order to apply nonlinear operation with rectified linear unit ReLU to the data after each neural layer operation. Define final layer with one neuron and with a linear activation function for the series of function output of the regression neural network algorithm.

Outputs from the multiple regression algorithms are fed as inputs to a final least-square linear regression model, and the output from this final least-square linear regression model is used as the final result for the combination regression analysis.

When training the model, series of input data and the "commonly well accepted" series of function outputs are collected as training data and fed into the model. The prediction function F is calculated and will become more and more accurate. When the model is fully trained with enough training data, the model can be used with future new series of input data to predict the future series of function outputs as the decision parameters.

We build multiple separate models by the above combination regression analysis in predicting a number of series of function outputs Y as decision parameters to control different devices. When the decision parameter Y is greater than a certain value, a control command is send to increase or decrease the liquid flow valve, the gas flow for the enhance gas flow device, or the height distance for the height servo motor.

The first model controls the liquid flow valve to adjust the flow volume of the liquid conversion solution from the liquid reservoir to the liquid controller. The second model controls the servo motor to adjust the height distance from the top of the liquid reservoir to the liquid controller. The third model controls the servo motors to adjust the height distances from the top of the liquid inside the gas cleaning cells to the gas inlets inside the gas cleaning cells. The fourth model controls the enhance gas flow devices to adjust the gas flow and the gas pressure from the two gas chambers.

This method of liquid-to-gas conversion, its design and parameter setting, can be used to utilize artificial intelligence to control the liquid conversion solution flow, liquid pressure, gas pressure, and temperature. At the side of the electron exchanger facing the gas chamber, the liquid conversion solution is converted into final gases and directly released into the gas chambers. The power consumed by the conversion cell will be optimized.

This liquid-to-gas conversion method can be used to convert different kinds of liquid conversion solution into different kinds of gases, and this conversion method can also be used to convert liquid water to hydrogen and oxygen gases.

Multiple conversion cells can be stacked vertically and horizontally, and they can share some of the common components. More conversion cells can be placed in the same physical space to achieve higher gas production level. Operation:

In the following example, we describe our method using water as liquid conversion solution to generate hydrogen and oxygen gases, but the principle of our method can be generalized to apply to other types of liquid conversion solutions to generate other types of gases. The following described embodiment is only one of the, but not all, embodiments of our presented method. Based on the embodiments of our presented method, all other embodiments obtained by those of ordinary skill in the art without creative efforts shall fall within the protection scope of our presented method.

The anode electron exchanger and cathode electron exchanger are placed in the liquid-to-gas conversion cell, and the conversion cell is separated into the cathode gas chamber 210, the liquid controller placed inside the liquid conversion solution chamber 230, and the anode gas chamber 220.

The liquid controller 100 is formed by stacking together a plurality of nonconductive controller sheets. Among them, the multiple track injection sheets 120 are in the middle section, and they are protected from the left and right by the liquid control sheets 110 and mesh material sheets 110.

The electron exchangers 240 and 250 facing the liquid conversion solution chamber and are in direct contact with the liquid controller. The other sides of the electron exchangers face the gas chambers. The surfaces of the electron exchangers are covered with holes. By applying a voltage to the cathode and anode electron exchange, electrons are exchanged on the sides facing the gas chambers, and the liquid conversion solution is converted into final gases that are released into the cathode gas chamber and the anode gas chamber. Gases pass through the two gas chambers outlets to the cathode and anode gas cleaning cells 350. Gas cleaning cells are filled with a gas cleaning liquid 360. Gas bubbles rise from the gas inlets of the gas cleaning cells to the gas outlets at the top of the gas cleaning cells.

On top of the liquid inlets of the multiple track injection sheets, a liquid flow valve 280 is placed to control the flow of liquid conversion solution 270 from the liquid reservoir 260 to the liquid controller 230.

The liquid conversion cell is equipped with an intelligent microprocessor (MCU) 310, which is responsible for the artificial intelligence machine learning calculation, and data is also transmitted to the local computing engine or the cloud computing engine via the Internet for calculation. The microprocessor controls the liquid flow valve and decides whether to increase or decrease the liquid conversion solution flowing from the liquid reservoir to the liquid controller.

Microprocessor is connected to a servo motor 340 to control the height distance from the liquid reservoir 260 to the liquid controller. Microprocessor is connected to servo motors 340 to control the height distances from the top of the liquid inside the gas cleaning cells 350 to the gas inlets inside the gas cleaning cells. Microprocessor is connected to two gas flow fans, acting as the enhance gas flow devices 370, to control the gas flow and the gas pressure coming from the two gas chambers.

The microprocessor is also connected to four liquid content sensors and hygrometer (HGO) 300, temperature sensors 330, pressure sensors 330, height distance sensors, gas flow sensors 320, voltage sensor, and current sensor. More sensors can be placed at selected locations within the liquid to gas conversion cell if necessary. Each liquid content sensor has a pair of resistive probes 290 to sense the liquid conversion solution level at various locations in the conversion cell. Potassium hydroxide is added to water and water is ionized to form the liquid conversion solution 270.

The water in the liquid controller is in contact with the cathode electron exchanger 240. Water molecules pass through the holes of the cathode electron exchanger. At this location, electrons are released into the water to reduce the water to hydrogen and hydroxide ions, hydrogen gas is released into the cathode gas chamber. The hydroxide ions from the cathode electron exchanger go through the liquid controller, reach the anode electron exchanger 250. At this anode electron exchanger, the hydroxide ions are converted into water, oxygen and electrons. The electrons are collected by the anode electron exchanger, and oxygen gas is released to the anode gas chamber.

The result is that hydrogen and oxygen gases are released separately from the gas outlets of the two gas cleaning cells. As more gas is produced, the water in the liquid controller dries up, and the microprocessor senses that the water content is low at this location. After artificial intelligence calculations, the microprocessor will increase or decrease the liquid flow valve, allowing more or less water from the liquid reservoir to flow evenly and quickly into the liquid controller. Microprocessor and servo motors control the height distance from the liquid reservoir to the liquid controller. Microprocessor and two servo motors control the height distances from the top of the gas cleaning cells to the gas inlets inside the gas cleaning cells. Microprocessor controls the two enhance gas flow devices to control the gas flow and gas pressure coming from the two gas chambers. As a result, microprocessor controls the liquid and gas flow volume, the pressure and the temperature inside the liquid conversion cell.

The result of our conversion method provides an energy efficient liquid-to-gas conversion method to generate hydrogen and oxygen gases from liquid water.

Conclusion, Ramifications, and Scope:

While the above description contains much specificity, these should not be construed as limitations on the scope of the invention, but rather as an exemplification of one preferred embodiment thereof. Many other variations are possible.

For example, we describe our method using an example of water as liquid conversion solution to generate hydrogen and oxygen gases, but the principle of our method can be generalized to apply to other types of liquid conversion solutions to generate other types of gases.

For example, we describe our method in manufacturing the puncture channels using precision technologies, comprising: chemical etching, plasma etching, laser drilling or electroforming. The puncture channels can possibly be manufactured by other kinds of technologies that are not listed in our described list of technologies, but the principle of our method can be generalized to apply to manufacturing the puncture channels with technologies that are able to create similar small openings.

For example, we describe our machine learning regression method by using a multi variable linear regression method as an illustration, but the principle of our regression method can be generalized to applying a combination of 1) single variable regression, 2) multi variable regression, 3) linear regression, and 4) nonlinear regression.

The described embodiment in the above description is only one of the, but not all, embodiments of our presented method. Based on the embodiments of our presented method, all other embodiments obtained by those of ordinary skill in the art without creative efforts shall fall within the protection scope of our presented method.

The scope of the invention should be determined not by the embodiments illustrated, but by the appended claims and their legal equivalents.

We claim:

1. A method for artificial intelligence pressure control multiple track injection conversion of liquid to gas, comprising:
   placing a liquid controller to fill a liquid conversion solution chamber inside a conversion cell;
   building said liquid controller following design parameters by stacking three or more nonconductive controller sheets that comprise the following: one or more multiple track injection sheets, one or more liquid control sheets, and one or more mesh material sheets;
   building said multiple track injection sheets with two or more tracks and one or more multiple track puncture channels on the surface of said multiple track injection sheets;
   building said liquid control sheets with one or more liquid control puncture channels on the surface of said liquid control sheets;
   feeding liquid conversion solution to said liquid controller through a liquid inlet of said liquid controller;
   placing electron exchangers, built with one or more holes, in said conversion cell, comprising:
   cathode electron exchanger, and anode electron exchanger;
   setting gas chambers in said conversion cell, comprising: cathode gas chamber, and anode gas chamber;
   placing said cathode electron exchanger in between said liquid conversion solution chamber and said cathode gas chamber inside said conversion cell;
   placing said anode electron exchanger in between said liquid conversion solution chamber and said anode gas chamber inside said conversion cell;
   using said electron exchangers each built with one conductive side and one nonconductive side;
   placing said nonconductive side of said cathode electron exchanger facing and in contact with said liquid controller;
   placing said nonconductive side of said anode electron exchanger facing and in contact with said liquid controller;
   placing said conductive side of said cathode electron exchanger facing said cathode gas chamber;
   placing said conductive side of said anode electron exchanger facing said anode gas chamber;
   applying a voltage to said anode electron exchanger and said cathode electron exchanger; and
   converting said liquid conversion solution into gases releasing to said gas chambers in said conversion cell.

2. The method of claim 1 wherein said building said liquid controller, further comprises:
   releasing said liquid conversion solution from said liquid controller to said electron exchangers and passing said liquid conversion solution through said one or more holes of said electron exchangers to said conductive side of said anode electron exchanger and to said conductive side of said cathode electron exchanger; and
   exchanging electrons with said liquid conversion solution on said conductive side of said anode electron exchanger and said conductive side of said cathode electron exchanger.

3. The method of claim 2 wherein said releasing said liquid conversion solution from said liquid controller, further comprises:

wherein said building said multiple track injection sheets follows said design parameters with said two or more tracks and said one or more multiple track puncture channels on the surface of said multiple track injection sheets to form a network of distribution channels to distribute said liquid conversion solution from said liquid inlet to locations across said multiple track injection sheets and for said liquid conversion solution to pass through;

wherein said building said liquid control sheets follows said design parameters with said one or more liquid control puncture channels on the surface for said liquid conversion solution to pass through;

building said mesh material sheets to follow said design parameters using mesh materials with small pores for said liquid conversion solution to pass through;

building said controller sheets and stacking said controller sheets to follow said design parameters and to control rate and amount of said liquid conversion solution in passing through said liquid controller; and setting said one or more multiple track puncture channels or said one or more liquid control puncture channels from adjacent said controller sheets to be out of alignment with each other, forming a pattern of interlocking said one or more multiple track puncture channels or said one or more liquid control puncture channels between adjacent said controller sheets.

4. The method of claim 3 wherein said building said multiple track injection sheets and said liquid control sheets to follow said design parameters, further comprises:

modeling said liquid conversion solution, due to surface tension, adhering on surfaces of said multiple track injection sheets and said liquid control sheets as one or more droplets and diffusing until a partial wetting equilibrium contact radius is reached;

expressing radius r of an adhering droplet of said one or more droplets on an adhered surface of said multiple track injection sheets or said liquid control sheets:

$$r = \sqrt{\frac{V}{\pi h}}, \text{ where } h = \sqrt{\frac{2\sigma(1-\cos\theta)}{\rho g}},$$

$\sigma$ is said surface tension, g is gravitational acceleration constant, $\theta$ is contact angle between said adhering droplet and said adhered surface, h is height of said adhering droplet, and V is volume of said adhering droplet;

expressing said adhering droplet with said radius overtime r(t) as:

$$r(t) = r_e\left[1 - \exp\left(-\left(\frac{2\gamma_{LG}}{r_e^{12}} + \frac{\rho g}{9r_e^{10}}\right)\frac{24\lambda V^4(t+t_0)}{\pi^2\eta}\right)\right]^{\frac{1}{6}};$$

expressing said adhering droplet with radius in perfect spread over time rp(t), which is the radius of said adhering droplet by assuming a perfect spreading of said adhering droplet and a delay time as:

$$rp(t) = \left[\left[\left(\gamma_{LG}\frac{96\lambda V^4}{\pi^2\eta}(t+t_0)^{\frac{1}{2}} + \left(\frac{\lambda(t+t_0)}{\eta}\right)^{\frac{2}{3}}\frac{24\rho g V^{\frac{8}{3}}}{7\cdot96^{\frac{1}{3}}\pi^{\frac{4}{3}}\gamma_{LG}^{\frac{1}{3}}}\right]\right]^{\frac{1}{6}},$$

$\gamma$ is coefficient of said surface tension, $\gamma LG$ is term factor of said surface tension, $\eta$ is viscosity of said liquid conversion solution, $\rho$ is density of said liquid conversion solution, $\lambda$ is shape factor of said adhering droplet, $t_0$ is experimental delay time, and $r_e$ is equilibrium radius of said adhering droplet at equilibrium;

making distances between identifiable adjacent pair of said one or more multiple track puncture channels or said one or more liquid control puncture channels as a multiple of said radius overtime r(t) or said radius in perfect spread overtime rp(t);

making radii of said one or more multiple track puncture channels or said one or more liquid control puncture channels no bigger than said radius overtime r(t) or said radius in perfect spread overtime rp(t);

making width of each track of said two or more tracks of said multiple track injection sheets as a multiple of said radius overtime r(t) or said radius in perfect spread overtime rp(t);

adjusting said width of each track of said two or more tracks of said multiple track injection sheets to one or more values depending on locations of said two or more tracks on said multiple track injection sheets;

adjusting said distances between said identifiable adjacent pair of said one or more multiple track puncture channels to one or more values depending on locations of said one or more multiple track puncture channels on said multiple track injection sheets; and adjusting said distances between said identifiable adjacent pair of said one or more liquid control puncture channels to one or more values depending on locations of said one or more liquid control puncture channels on said liquid control sheets.

5. The method of claim 4 wherein said making radii of said one or more multiple track puncture channels or said one or more liquid control puncture channels, further comprises: expressing height d of a column of said liquid conversion solution inside a containing puncture channel of said one or more multiple track puncture channels or said one or more liquid control puncture channels as:

$$d = \frac{2\gamma\cos x}{\rho g r(t)};$$

x is the contact angle between said liquid conversion solution of said column and contact surface inside said containing puncture channel;

making thickness of said one or more multiple track puncture channels or said one or more liquid control puncture channels no thicker than said height d; and making spacing between adjacent said multiple track injection sheets and said liquid control sheets to be no larger than said height d.

6. The method of claim 3 wherein said building said multiple track injection sheets and said liquid control sheets to follow said design parameters, further comprises: making said one or more multiple track puncture channels or said one or more liquid control puncture channels following said design parameters that comprise one or more of the following design patterns: Y-shaped, X-shaped, and star-shaped design pattern; and utilizing said design patterns to help enhance said liquid conversion solution adhering to said multiple track injection sheets and said liquid control sheets.

7. The method of claim 3 wherein said building said controller sheets to follow said design parameters further comprises:

manufacturing said mesh material sheets by a precision material woven technology;

manufacturing said multiple track injection sheets and said liquid control sheets with technologies that comprise one or more of the following:

chemical etching by applying chemicals to etch away specific points of material to form said two or more tracks, said one or more multiple track puncture channels, and said one or more liquid control puncture channels;

plasma etching by applying plasma to etch away specific points of material to form said two or more tracks, said one or more multiple track puncture channels, and said one or more liquid control puncture channels;

laser drilling by repeatedly applying a pulsing focused laser to material to cut away specific spots to form said two or more tracks, said one or more multiple track puncture channels, and said one or more liquid control puncture channels; and electroforming by electro depositing of material onto a mandrel to form said two or more tracks, said one or more multiple track puncture channels and said one or more liquid control puncture channels.

8. The method of claim 1 wherein said converting said liquid conversion solution into said gases in said conversion cell further comprises:

converting one or more kinds of said liquid conversion solution into one or more kinds of said gases;

stacking two or more cells of said conversion cell vertically and horizontally; and sharing common components among said two or more cells of said conversion cell.

9. A method for conversion of liquid to gas, comprising:

placing a liquid controller to fill a liquid conversion solution chamber inside a conversion cell;

placing liquid conversion solution in a liquid reservoir and feeding said liquid conversion solution from said liquid reservoir through a liquid flow valve to said liquid controller;

placing electron exchangers in said conversion cell, comprising: a cathode electron exchanger, and an anode electron exchanger;

setting gas chambers in said conversion cell, comprising: a cathode gas chamber, and an anode gas chamber;

placing said cathode electron exchanger in between said liquid conversion solution chamber and said cathode gas chamber inside said conversion cell;

placing said anode electron exchanger in between said liquid conversion solution chamber and said anode gas chamber inside said conversion cell;

applying a voltage to said anode electron exchanger and said cathode electron exchanger;

converting said liquid conversion solution into gases releasing to said gas chambers in said conversion cell;

building gas cleaning cells that comprise a cathode gas cleaning cell and an anode gas cleaning cell;

feeding cathode output gas from an outlet of said cathode gas chamber to said cathode gas cleaning cell filled with a cathode gas cleaning liquid;

feeding anode output gas from an outlet of said anode gas chamber to said anode gas cleaning cell filled with an anode gas cleaning liquid; and controlling said conversion cell by using a computing engine, built with one or more computing engines connected with a computer network, to perform one or more artificial intelligence calculations.

10. The method of claim 9 wherein said controlling said conversion cell further comprises:

placing field devices at one or more control locations that comprise one or more of the following:

locations inside or around said conversion cell, locations inside or around said liquid reservoir, and locations inside or around said gas cleaning cells;

performing said one or more artificial intelligence calculations to exchange data with said field devices connected through a data network and to control said field devices; and performing said one or more artificial intelligence calculations to help adjusting physical parameters at said one or more control locations.

11. The method of claim 10 wherein said adjusting said physical parameters further comprises:

adjusting said physical parameters that comprise liquid pressure at said one or more control locations;

placing a reservoir servo motor, as part of said field devices, to move said liquid reservoir to adjust said liquid pressure from the height of volume of said liquid conversion solution in said liquid reservoir; and placing cleaning cell servo motors, as part of said field devices, to move said gas cleaning cells to adjust said liquid pressure from the heights of volumes of said cathode gas cleaning liquid in said cathode gas cleaning cell and said anode gas cleaning liquid in said anode gas cleaning cell.

12. The method of claim 10 wherein said performing said one or more artificial intelligence calculations further comprises:

performing said one or more artificial intelligence calculations that comprise one or more of the following: single variable equations, multiple variable equations, linear equations, nonlinear equations, regression analysis, neural network analysis, and foundation model analysis;

expressing a predictive function F(X) for said one or more artificial intelligence calculations to accept input data to predict decision parameter used for adjusting said physical parameters or for controlling said field devices as:

$$Y = F(X1, X2, \ldots, Xn);$$

Y is said decision parameter;

X1 to Xn−1 are said input data from field device 1 through field device N−1 of said field devices;

Xn is target required gas output level of said conversion cell; and evaluating said decision parameter Y to determine commands to send to control said field devices and to adjust said physical parameters.

13. The method of claim 10 wherein said adjusting said physical parameters further comprises:

adjusting said physical parameters that comprise liquid flow rate at said one or more control locations.

14. The method of claim 10 wherein said adjusting said physical parameters further comprises:

adjusting said physical parameters that comprise gas flow rate at said one or more control locations.

15. The method of claim 10 wherein said placing said field devices further comprises:

placing said field devices that comprise gas flow valves at said one or more control locations.

16. The method of claim 10 wherein said placing said field devices further comprises:

placing said field devices that comprise liquid flow valves at said one or more control locations.

17. The method of claim 10 wherein said adjusting said physical parameters further comprises:

adjusting said physical parameters that comprise temperature at said one or more control locations.

18. The method of claim 10 wherein said adjusting said physical parameters further comprises:

adjusting said physical parameters that comprise gas pressure at said one or more control locations.

19. The method of claim 10 wherein said placing said field devices further comprises:

placing at said one or more control locations said field devices that comprise one or more of the following: liquid pressure sensors, gas pressure sensors, liquid flow sensors, gas flow sensors, liquid content sensors, and temperature sensors.

20. The method of claim 9 wherein said converting said liquid conversion solution into said gases further comprises:

building said liquid controller following design parameters by stacking three or more nonconductive controller sheets that comprise the following: one or more multiple track injection sheets, one or more liquid control sheets, and one or more mesh material sheets;

using said electron exchangers covered with one or more holes;

using said electron exchangers each built with one conductive side and one nonconductive side;

placing said nonconductive side of said cathode electron exchanger facing said liquid controller and in contact with said liquid controller;

placing said nonconductive side of said anode electron exchanger facing said liquid controller and in contact with said liquid controller;

placing said conductive side of said cathode electron exchanger facing said cathode gas chamber; and placing said conductive side of said anode electron exchanger facing said anode gas chamber.

* * * * *